United States Patent
Kobayashi

(10) Patent No.: US 9,833,952 B2
(45) Date of Patent: Dec. 5, 2017

(54) THREE-DIMENSIONAL PRINTING APPARATUS

(71) Applicant: Roland DG Corporation, Hamamatsu-shi, Shizuoka (JP)

(72) Inventor: Kouichi Kobayashi, Hamamatsu (JP)

(73) Assignee: ROLAND DG CORPORATION, Shizuoka (JP)

( * ) Notice: Subject to any disclaimer, the term of this patent is extended or adjusted under 35 U.S.C. 154(b) by 155 days.

(21) Appl. No.: 14/837,073

(22) Filed: Aug. 27, 2015

(65) Prior Publication Data
US 2016/0059494 A1 Mar. 3, 2016

(30) Foreign Application Priority Data

Aug. 28, 2014 (JP) .................. 2014-174048

(51) Int. Cl.
| | |
|---|---|
| B29C 67/00 | (2017.01) |
| B29C 64/20 | (2017.01) |
| B29K 105/00 | (2006.01) |
| B33Y 30/00 | (2015.01) |
| B33Y 50/02 | (2015.01) |
| B29C 64/00 | (2017.01) |
| B33Y 10/00 | (2015.01) |

(52) U.S. Cl.
CPC .......... B29C 67/0088 (2013.01); B29C 64/20 (2017.08); B29C 67/0066 (2013.01); B29C 64/00 (2017.08); B29K 2105/0002 (2013.01); B29K 2105/0058 (2013.01); B33Y 10/00 (2014.12); B33Y 30/00 (2014.12); B33Y 50/02 (2014.12)

(58) Field of Classification Search
CPC ......... B29C 64/20; B29C 64/00; B33Y 10/00; B33Y 50/02; B33Y 30/00; B29K 2015/0058; B29K 2105/0002
USPC ................................ 264/401; 425/174.4, 375
See application file for complete search history.

(56) References Cited

U.S. PATENT DOCUMENTS

| | | | | |
|---|---|---|---|---|
| 5,273,691 A | * | 12/1993 | Hull | ........................ B44B 1/006 118/423 |
| 5,594,652 A | * | 1/1997 | Penn | ...................... H05K 3/125 345/419 |

(Continued)

FOREIGN PATENT DOCUMENTS

JP 2003-039564 A 2/2003

*Primary Examiner* — Nahida Sultana
(74) *Attorney, Agent, or Firm* — Keating & Bennett, LLP

(57) ABSTRACT

A three-dimensional printing apparatus that forms a three-dimensional object using cross-sectional shapes of the object includes a controller that is configured or programmed to include a dividing unit that divides a cross-sectional shape into a plurality of blocks, a shape determining unit that determines whether one of the blocks has a predetermined shape and defines the block having the predetermined shape as a characteristic block, a count determining unit that determines whether the proportion of the number of the characteristic blocks to the total number of the blocks is equal to or greater than a predetermined proportion, and a light application unit that sets the energy of light from a light source to a first energy or to a second energy being lower than the first energy depending on the proportion, when applying the light to a photocurable resin in a region corresponding to the characteristic blocks.

12 Claims, 8 Drawing Sheets

(56) References Cited

U.S. PATENT DOCUMENTS

| | | | | |
|---|---|---|---|---|
| 5,718,951 A | * | 2/1998 | Sterett | B22F 3/115 |
| | | | | 164/459 |
| 5,746,844 A | * | 5/1998 | Sterett | B22F 3/115 |
| | | | | 148/522 |
| 5,787,965 A | * | 8/1998 | Sterett | B22D 23/00 |
| | | | | 164/155.3 |
| 2002/0155189 A1 | | 10/2002 | John | |
| 2006/0078638 A1 | * | 4/2006 | Holmboe | B29C 67/0066 |
| | | | | 425/174.4 |
| 2007/0075460 A1 | * | 4/2007 | Wahlstrom | B29C 67/0066 |
| | | | | 264/401 |
| 2012/0328726 A1 | * | 12/2012 | Zenere | B29C 67/0066 |
| | | | | 425/174.4 |
| 2013/0052292 A1 | * | 2/2013 | Busato | B29C 67/0066 |
| | | | | 425/174.4 |
| 2013/0270746 A1 | * | 10/2013 | Elsey | B29C 35/0805 |
| | | | | 264/447 |
| 2014/0191442 A1 | * | 7/2014 | Elsey | B29C 67/0062 |
| | | | | 264/401 |
| 2014/0339741 A1 | * | 11/2014 | Aghababaie | B33Y 30/00 |
| | | | | 264/401 |

* cited by examiner

THREE-DIMENSIONAL PRINTING APPARATUS

The present application claims priority from Japanese Patent Application No. 2014-174048, filed on Aug. 28, 2014, which is incorporated by reference herein in its entirety.

BACKGROUND OF THE INVENTION

1. Field of the Invention

The present invention relates to a three-dimensional printing apparatus.

2. Description of the Related Art

A three-dimensional printing apparatus for forming a three-dimensional object is conventionally known (for example, see JP 2003-39564 A). The three-dimensional printing apparatus applies light to a liquid photocurable resin accommodated in a vat to cause the photocurable resin to cure, so as to form a three-dimensional object.

This type of three-dimensional printing apparatus forms a three-dimensional object by preparing cross-sectional shapes of the three-dimensional object and successively stacking resin layers each being formed by curing a photocurable resin and having a shape corresponding to one of the cross-sectional shapes. For example, the three dimensional printing apparatus has a platform having an opening formed therein, a vat placed on the platform and made of a resin, for accommodating a photocurable resin, and a holder being disposed above the vat and capable of being raised and lowered. An optical system is disposed below the platform. The optical system includes a light source for emitting light, a mirror, and so forth. The light emitted from the light source is reflected by the mirror. The light reflected by the mirror is applied to the photocurable resin in the vat through the opening of the platform. A portion of the photocurable resin in the vat that is exposed to the light is cured.

The exposed position that is exposed by the light applied from the light source is controlled according to the cross-sectional shape, whereby the position of the resin to be cured is changed as desired. This enables the cured resin to form the cross-sectional shape. Then, the holder is elevated step by step, so that the desired cross-sectional shape is consecutively formed toward the bottom. In this way, the desired three-dimensional object is formed.

When three-dimensional objects are formed using the same vat for a long period of time, the part of the vat that has been exposed to light may often become opaque (this phenomenon is hereinafter referred to as "whitening"). When light is applied to the whitened vat to cure the photocurable resin inside the vat, part of the light is blocked by the whitened portion of the vat. Consequently, the photocurable resin may not be cured appropriately in an adjacent region to the whitened portion of the vat. This may prevent formation of a desired cross-sectional shape. As a consequence, the product quality of the resulting object may be degraded.

SUMMARY OF THE INVENTION

Preferred embodiments of the present invention provide a three-dimensional printing apparatus that significantly reduces or prevents whitening of a vat.

The present inventor has discovered that a possible cause of the whitening of the vat is as follows. The surface of the vat, which is made of a resin, has a plurality of microcavities therein. When the light from the light source is applied to the photocurable resin while the microcavities are holding the photocurable resin therein, some portion of the photocurable resin is cured while trapped inside the microcavities. It is often the case that when the cured resin is drawn up from the vat, the portion of the resin trapped and cured in the microcavities cannot be pulled out of the cavities. Thus, the cured resin partially remains in the microcavities of the vat, and as a consequence, the vat is whitened. The present inventor has discovered that it is possible to significantly reduce or prevent the whitening of the vat when the cured resin has a degree of hardness such that the cured resin is able to be removed from the microcavities of the vat, even if the resin has been trapped and cured in the microcavities. The present inventor has discovered that it is possible to prevent the whitening of the vat by adjusting the energy of the light emitted from the light source so as to reduce the hardness of the cured photocurable resin.

A preferred embodiment of the present invention provides a three-dimensional printing apparatus that forms a three-dimensional object by preparing cross-sectional shapes of the three-dimensional object and successively stacking resin layers having corresponding shapes to the cross-sectional shapes, each of the layers being formed by curing a liquid photocurable resin. The three-dimensional printing apparatus includes a vat, a lighting device, and a controller. The vat is made of a resin and accommodates the photocurable resin. The lighting device is disposed below the vat, and includes a light source emitting light. The lighting device applies the light from the light source to the photocurable resin in the vat. The controller controls the lighting device. The controller is configured or programmed to provide and include a dividing unit, a divided block calculating unit, a shape determining unit, a counting unit, a count determining unit, and a light application unit. The dividing unit divides at least one of the cross-sectional shapes into a plurality of blocks. The divided block calculating unit counts the total number of the blocks divided by the dividing unit. The shape determining unit determines whether or not each of the plurality of blocks divided by the dividing unit has a predetermined shape, and defines at least one of the plurality of blocks that has been determined to have the predetermined shape as a characteristic block. The counting unit counts the number of the characteristic blocks. The count determining unit determines whether or not the proportion of the number of the characteristic blocks counted by the counting unit to the total number of the blocks counted by the divided block calculating unit is equal to or greater than a predetermined proportion. The light application unit sets an energy of the light from the light source to a first energy at least when applying the light to the photocurable resin in a region corresponding to the characteristic blocks if the proportion is determined by the count determining unit to be less than the predetermined proportion. The light application unit sets an energy of the light from the light source to a second energy that is lower than the first energy at least when applying the light to the photocurable resin in the region corresponding to the characteristic blocks if the proportion is determined by the count determining unit to be equal to or greater than the predetermined proportion.

In the above-described three-dimensional printing apparatus, the shape determining unit determines whether or not each of the plurality of blocks divided by the dividing unit has a predetermined shape. The predetermined shape is, for example, a complicated shape. When forming such a complicated shape, the energy of the light from the light source is often set high in order to form the shape more precisely. However, when the energy of the light from the light source is set excessively high, the whitening of the vat tends to occur easily. In view of the problem, the shape determining unit determines whether or not each of the divided blocks is a characteristic block. Then, the counting unit counts the number of the characteristic blocks. If the count determining unit determines that the proportion of the number of the characteristic blocks to the total number of the divided characteristic blocks is equal to or greater than a predetermined proportion, the cross-sectional shape can be determined to be a complicated cross-sectional shape. At this time, at least when light is applied to the photocurable resin in the region corresponding to the characteristic blocks, the energy of the light from the light source is set to the second energy that is lower than the first energy. This makes it possible to lower the hardness of the photocurable resin in the region corresponding to the characteristic blocks. This means that, even when the resin has been trapped and cured in the microcavities of the vat, the cured resin is easily removed from the microcavities of the vat. Thus, the whitening of the vat is reliably significantly reduced or prevented.

In one preferred embodiment of the present invention, the light application unit sets the energy of the light from the light source to the second energy when applying the light to the photocurable resin in a region corresponding to the at least one cross-sectional shape if the proportion of the number of the characteristic blocks to the total number of the blocks is determined by the count determining unit to be equal to or greater than the predetermined proportion.

In the above-described preferred embodiment, if the proportion of the number of the characteristic blocks to the total number of the blocks is determined by the count determining unit to be equal to or greater than the predetermined proportion, the energy of the light applied from the light source to the photocurable resin in the region corresponding to the at least one cross-sectional shape is set to the second energy, which is lower than the first energy. This makes it possible to lower the energy of the light from the light source for the entire region of the cross-sectional shape without performing a complicated control operation, such as adjusting the light energy region by region, so that the adjusted light is able to be applied to the photocurable resin in the vat.

In another preferred embodiment of the present invention, a three-dimensional printing apparatus that forms a three-dimensional object by preparing cross-sectional shapes of the three-dimensional object and successively stacking resin layers having corresponding shapes to the cross-sectional shapes, each of the layers formed by curing a liquid photocurable resin includes a vat, a lighting device, and a controller. The vat is made of a resin and accommodates the photocurable resin. The lighting device is disposed below the vat, and at least includes a light source emitting light. The lighting device applies the light from the light source to the photocurable resin in the vat. The controller controls the lighting device. The controller is configured or programmed to include a dividing unit, a shape determining unit, a counting unit, a count determining unit, and a light application unit. The dividing unit divides at least one of the cross-sectional shapes into a plurality of blocks. The shape determining unit determines whether or not each of the plurality of blocks divided by the dividing unit has a predetermined shape, and defines at least one of the plurality of blocks that has been determined to have the predetermined shape as a characteristic block. The counting unit counts the number of the characteristic blocks. The count determining unit determines whether or not the number of the characteristic blocks counted by the counting unit is equal to or greater than a predetermined number. The light application unit sets an energy of the light from the light source to a first energy at least when applying the light to the photocurable resin in a region corresponding to the characteristic blocks if the number of the characteristic block is determined by the count determining unit to be less than the predetermined number. The light application unit sets an energy of the light from the light source to a second energy that is lower than the first energy at least when applying the light to the photocurable resin in the region corresponding to the characteristic blocks if the number of the characteristic blocks is determined by the count determining unit to be equal to or greater than the predetermined number.

With the just-described three-dimensional printing apparatus, if the number of the characteristic blocks is determined by the count determining unit to be equal to or greater than a predetermined number, the cross-sectional shape is determined to be a complicated cross-sectional shape. At least when light is applied to the photocurable resin in the region corresponding to the characteristic blocks, the energy of the light from the light source is set to the second energy that is lower than the first energy. This makes it possible to lower the hardness of the photocurable resin. This means that, even when the resin has been trapped and cured in the microcavities of the vat, the cured resin is easily removed from the microcavities of the vat. Thus, the whitening of the vat is reliably significantly reduced or prevented.

In another preferred embodiment of the present invention, the light application unit sets the energy of the light from the light source to the second energy when applying the light to the photocurable resin in a region corresponding to the at least one cross-sectional shape if the number of the characteristic blocks is determined by the count determining unit to be equal to or greater than the predetermined number.

In the above-described preferred embodiment, if the number of the characteristic blocks is determined by the count determining unit to be equal to or greater than the predetermined number, the energy of the light applied from the light source to the photocurable resin in the region corresponding to the at least one cross-sectional shape is set to the second energy, which is lower than the first energy. This makes it possible to lower the energy of the light from the light source for the entire region of the cross-sectional shape without performing a complicated control operation, such as adjusting the light energy region by region, so that the adjusted light can be applied to the photocurable resin in the vat.

In another preferred embodiment of the present invention, the dividing unit is configured or programmed to include an extracting unit and a shape dividing unit. The extracting unit extracts a connecting point of adjacent line segments of a contour of the at least one cross-sectional shape as a characteristic point if an interior angle defined by the adjacent line segments is equal to or greater than about 270 degrees, for example. When the extracting unit extracts a plurality of the characteristic points and when a connecting line that connects two adjacent ones of the characteristic points to each other on the contour of the at least one cross-sectional shape is within a region of the at least one cross-sectional shape, the shape dividing unit divides the at least one cross-sectional shape into the plurality of blocks by dividing the at least one cross-sectional shape at the connecting line.

In the just-described preferred embodiment, the characteristic points are extracted by the extracting unit, and the cross-sectional shape is divided into a plurality of blocks by the shape dividing unit. Thus, a portion of the cross-sectional shape that contains an outwardly protruding shape is able to be separated as one block. The outwardly protruding shape of the cross-sectional shape is a complicated shape, and is difficult to form. For this reason, the portion containing such a complicated shape is separated as one block. Thus, the block of the cross-sectional shape that has the outwardly protruding shape is able to be determined by the shape determining unit to be a characteristic block.

In another preferred embodiment of the present invention, the shape determining unit is configured or programmed to include an area determining unit that determines one of the plurality of blocks to be the characteristic block if the proportion of the area of the one of the plurality of blocks to the area of a target region of the light source is equal to or less than a predetermined proportion.

If the proportion of the area of a block to the area of the target region of the light source is within the predetermined proportion, that block is able to be determined to be a block with a small area. The block with a small area has a complicated shape and is difficult to form. For this reason, the block with a small area can be defined as a characteristic block. Thus, in the just-described preferred embodiment, whether or not a block is a characteristic block is able to be determined by the area determining unit based on the area of the block.

In another preferred embodiment of the present invention, the shape determining unit is configured or programmed to include an interior angle determining unit that determines one of the plurality of blocks to be the characteristic block if, among the interior angles at vertices of the one of the plurality of blocks that are not at the characteristic points, the smallest one of the interior angles is an acute angle.

When the smallest interior angle of a block is an acute angle among the interior angles at the vertices of the block that are not at the characteristic points, the block may be considered as having a pointed shape. The pointed shape is a complicated shape, and is difficult to form. For this reason, the block that has such a pointed shape is able to be defined as a characteristic block. Thus, in the just-described preferred embodiment, whether or not a block is a characteristic block is able to be determined by obtaining the interior angles of the block by the interior angle determining unit.

In another preferred embodiment of the present invention, the shape determining unit is configured or programmed to include a spacing determining unit that determines one of the plurality of blocks to be the characteristic block if the one of the plurality of blocks and an adjacent one of the plurality of blocks are spaced apart from each other and a spacing distance therebetween is equal to or less than a predetermined distance.

When the adjacent blocks are spaced apart from each other and the spacing distance therebetween is equal to or less than the predetermined distance, it means that the gap between the adjacent blocks is narrow. When the gap between the blocks is narrow, such blocks are difficult to form because it is necessary to provide a small space between the blocks. For this reason, the block having a narrow gap between it and an adjacent block thereto is able to be considered as a characteristic block, which has a complicated shape. Therefore, the above-described preferred embodiment enables the spacing determining unit to determine whether or not a block is a characteristic block when the block is spaced apart from an adjacent block thereto, based on the spacing distance therebetween.

Preferred embodiments of the present invention makes it possible to provide three-dimensional printing apparatuses that significantly reduce or prevent the whitening of the vat.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinbelow, three-dimensional printing apparatuses according to preferred embodiments of the present invention will be described. The preferred embodiments described herein are not intended to limit the present invention. The parts and components that exhibit the same effects are denoted by the same reference symbols, and repetitive description thereof may be omitted.

Figure 1:
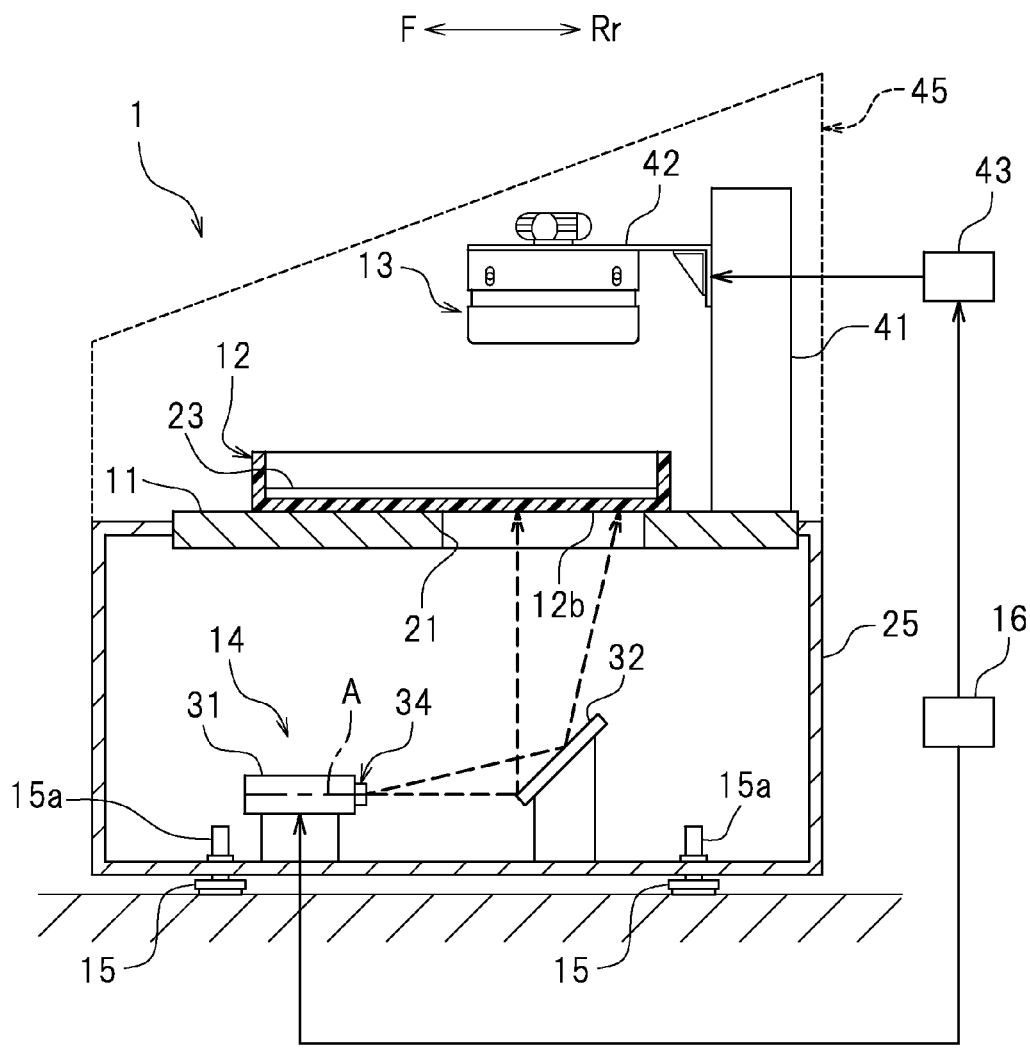
FIG. 1 is a vertical cross-sectional view illustrating a three-dimensional printing apparatus.
Figure 2:
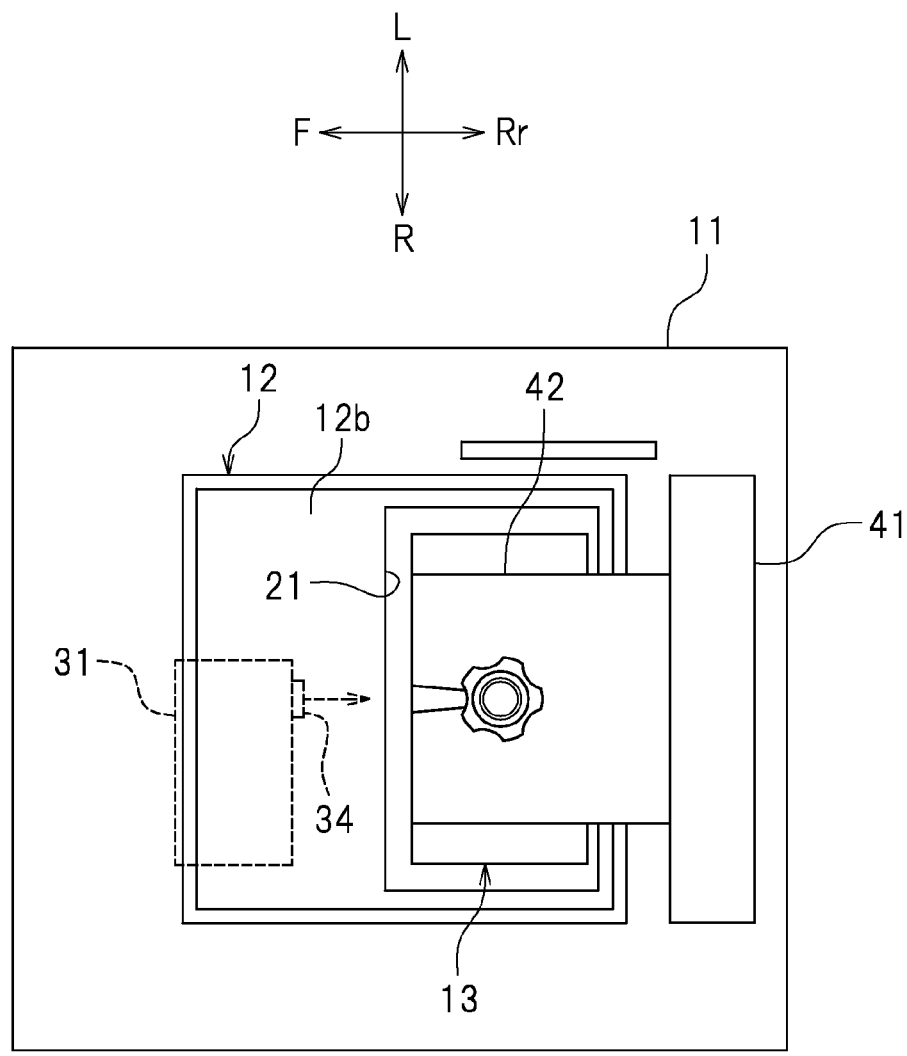
FIG. 2 is a plan view illustrating the three-dimensional printing apparatus.

FIG. 1 is a vertical cross-sectional view of a three-dimensional printing apparatus 1 according to the present preferred embodiment. FIG. 2 is a plan view of the three-dimensional printing apparatus 1. In the following description, the left and the right of FIG. 1 correspond to the front and the rear of the three-dimensional printing apparatus 1, respectively. The top and the bottom of FIG. 1 correspond to the left and the right of the three-dimensional printing apparatus 1, respectively. In FIG. 1 and so forth, reference characters F, Rr, L, and R indicate front, rear, left, and right, respectively. These directional terms are, however, merely provided for purposes in illustration and are not intended to limit the preferred embodiments of the three-dimensional printing apparatus 1 in any way.

The three-dimensional printing apparatus 1 is an apparatus that forms a three-dimensional object by preparing cross-sectional shapes of the three-dimensional object and successively stacking resin layers having corresponding shapes to the cross-sectional shapes, each of the layers being formed by curing a liquid photocurable resin. The term "cross-sectional shape" herein means one of the cross-sectional shapes of a three-dimensional object that are sliced at every predetermined thickness (for example, about 0.1 mm) in parallel or substantially parallel to each other. As illustrated in FIG. 1, the three-dimensional printing apparatus 1 includes a platform 11, a vat 12, a holder 13, a lighting device 14, and a controller 16.

An opening 21 is provided in the platform 11. The opening is a portion through which the light to be applied to a later-described photocurable resin 23 is allowed to pass. The shape of the opening 21 is not particularly restricted. In the present preferred embodiment, the shape of the opening 21 preferably is a rectangular or substantially rectangular shape when viewed in plan, as illustrated in FIG. 2.

As illustrated in FIG. 1, the vat 12 is placed or disposed on the platform 11. The vat 12 is removably attached to the platform 11. As illustrated in FIG. 2, the vat 12 covers the opening 21 of the platform 11 when placed on the platform 11. As illustrated in FIG. 1, the vat 12 accommodates a liquid photocurable resin 23. The photocurable resin 23 refers to a resin capable of being cured by exposure to light. As illustrated in FIG. 2, the vat 12 is a container preferably with a rectangular or substantially rectangular shape when viewed in plan. The vat 12 includes a bottom plate 12b preferably with a rectangular or substantially rectangular shape when viewed in plan. The vat 12 also includes a left side plate, a right side plate, a front side plate, and a rear side plate, which stand upright respectively from the left end, the right end, the front end, and the rear end of the bottom plate 12b. A portion of the bottom plate 12b of the vat 12 is positioned above the opening 21 of the platform 11 when the vat 12 is placed on the platform 11. Herein, a rear portion of the bottom plate 12b of the vat 12 is positioned above the opening 21. At least the bottom plate 12b of the vat 12 is formed of a material capable of transmitting light. For example, the bottom plate 12b of the vat 12 is formed of a transparent resin. In the present preferred embodiment, the entirety of the vat 12 is formed of a transparent acrylic resin.

As illustrated in FIG. 1, the holder 13 is disposed above the vat 12. Herein, the holder 13 is disposed above the opening 21 of the platform 11. The shape of the holder 13 is not particularly restricted. Herein, as illustrated in FIG. 2, the holder 13 preferably has a rectangular or substantially rectangular shape when viewed in plan. The holder 13 is a member that is capable of being raised and lowered. As illustrated in FIG. 1, the holder 13 pulls up the photocurable resin 23 that has been cured by exposure to the light from a later-described projector 31 of the lighting device 14. The holder 13 is configured so that it can be immersed in the photocurable resin 23 in the vat 12 when it is lowered. The holder is configured so that, when it is raised, it can lift the photocurable resin 23 that has been cured by exposure to the light. In the present preferred embodiment, the platform 11 is provided with a supporting pillar 41 extending vertically. A slider 42 is fitted to a front portion of the supporting pillar 41. The slider 42 is capable of being raised and lowered along the supporting pillar 41. The slider 42 is driven upward or downward by a motor 43. Herein, the holder 13 is fitted to the slider 42, which is capable of being raised and lowered. The holder 13 is driven upward or downward by the motor 43. The supporting pillar 41 supports the holder 13 indirectly via the slider 42 so that the holder 13 is capable of being raised and lowered. The supporting pillar 41, however, may directly support the holder 13. The holder 13 is disposed in front of the supporting pillar 41.

The lighting device 14 is disposed below the platform 11 and the vat 12. The lighting device 14 applies light to the photo-curable resin 23 inside the vat 12. In the present preferred embodiment, the lighting device 14 is accommodated in a case 25 provided below the platform 11. The lighting device 14 includes a projector 31 and a mirror 32.

The projector 31 is one example of the light source that emits light. The light source of the lighting device 14 is, however, not limited to the projector 31. In the present preferred embodiment, the projector 31 is disposed below a front portion of the platform 11. The projector 31 is disposed directly below the vat 12. The projector 31 is disposed frontward and obliquely downward relative to the holder 13. Herein, the projector 31 is provided with a lens 34. The lens 34 is disposed at a rear portion of the projector 31. The light from the projector 31 is emitted through the lens 34 so as to travel from the front toward the rear. The light projecting direction of the projector 31 is, however, not particularly restricted. Herein, the light emitted from the projector 31 is applied more to a region above the horizontal plane through the optical axis A of the lens 34 than to a region thereunder.

The mirror 32 reflects the light emitted from the projector 31 toward the vat 12. In the present preferred embodiment, the mirror 32 is disposed below the opening 21 in the platform 11 and at the rear of the projector 31. The mirror 32 and the projector 31 are lined up in a front-to-rear direction. The mirror 32 is disposed so as to be tilted downward toward the front. The light emitted from the projector 31 is reflected by the mirror 32. The light reflected by the mirror 32 is applied to the photocurable resin 23 in the vat 12 through the opening 21 in the platform 11. Here, prior to forming a three-dimensional object, it is necessary to adjust the direction of the light to be applied so that all the light emitted from the projector 31 can pass through the opening 21. In the present preferred embodiment, the direction of the light to be applied is adjusted by adjusting the position of the projector 31 prior to forming a three-dimensional object. However, it is also possible to adjust the direction of the light to be applied by adjusting the angle of the mirror 32.

In the present preferred embodiment, the three-dimensional printing apparatus 1 includes legs 15. The legs 15 enable tilting of the vat 12 so that a front portion of the bottom plate 12b of the vat 12 is disposed upward relative to a rear portion of the bottom plate 12b of the vat 12. In other words, the legs 15 tilt the vat 12 rearward. Herein, the bottom plate of the case 25 is provided with the legs 15. FIG. 1 depicts the legs 15 that are provided at a front left portion and a rear left portion of the bottom plate of the case 25. Although not shown in the drawings, similar legs 15 are also provided at a front right portion and a rear right portion of the bottom plate of the case 25.

The case 25 supports the platform 11. Herein, the legs 15 at the front side are longer than the legs 15 at the rear side. This allows the case 25 to be tilted downward toward the rear. When the case 25 is tilted downward toward the rear, the vat 12 placed on the platform 11 is also tilted downward toward the rear. In the present preferred embodiment, the vat 12 is able to be tilted by adjusting the length of each of the legs 15. Herein, the length of each of the four legs 15 is able to be adjusted independently from each other. Each of the legs 15 includes a shaft 15a that is inserted in a hole (not shown) in the bottom surface of the case 25. By adjusting the length of the shaft 15a by which it is inserted in the bottom plate of the case 25 as appropriate, the length of each of the legs 15 is able to be adjusted. As a result, the vat 12 is able to be tilted as appropriate. The mechanism that adjusts the insertion length of the shaft 15a when inserting the shaft 15a in the bottom plate of the case 25 is not particularly restricted. For example, the shaft 15a may be a male screw, and the hole in the bottom plate may be a female thread. In this case, the length of each of the legs 15 is adjusted by turning the shaft 15a.

In the present preferred embodiment, the three-dimensional printing apparatus 1 may include a cover 45. The cover 45 covers the members, such as the vat 12, the holder 13, and the supporting pillar 41, that are disposed upward relative to the platform 11. The cover 45 prevents dust or the like from entering the photocurable resin 23 in the vat 12. In addition, the cover 45 prevents the applied light from leaking outside. It is preferable that the cover 45 be made of a material that blocks the light containing a wavelength at which the photocurable resin 23 is cured. The cover 45 may be opaque.

Figure 3:
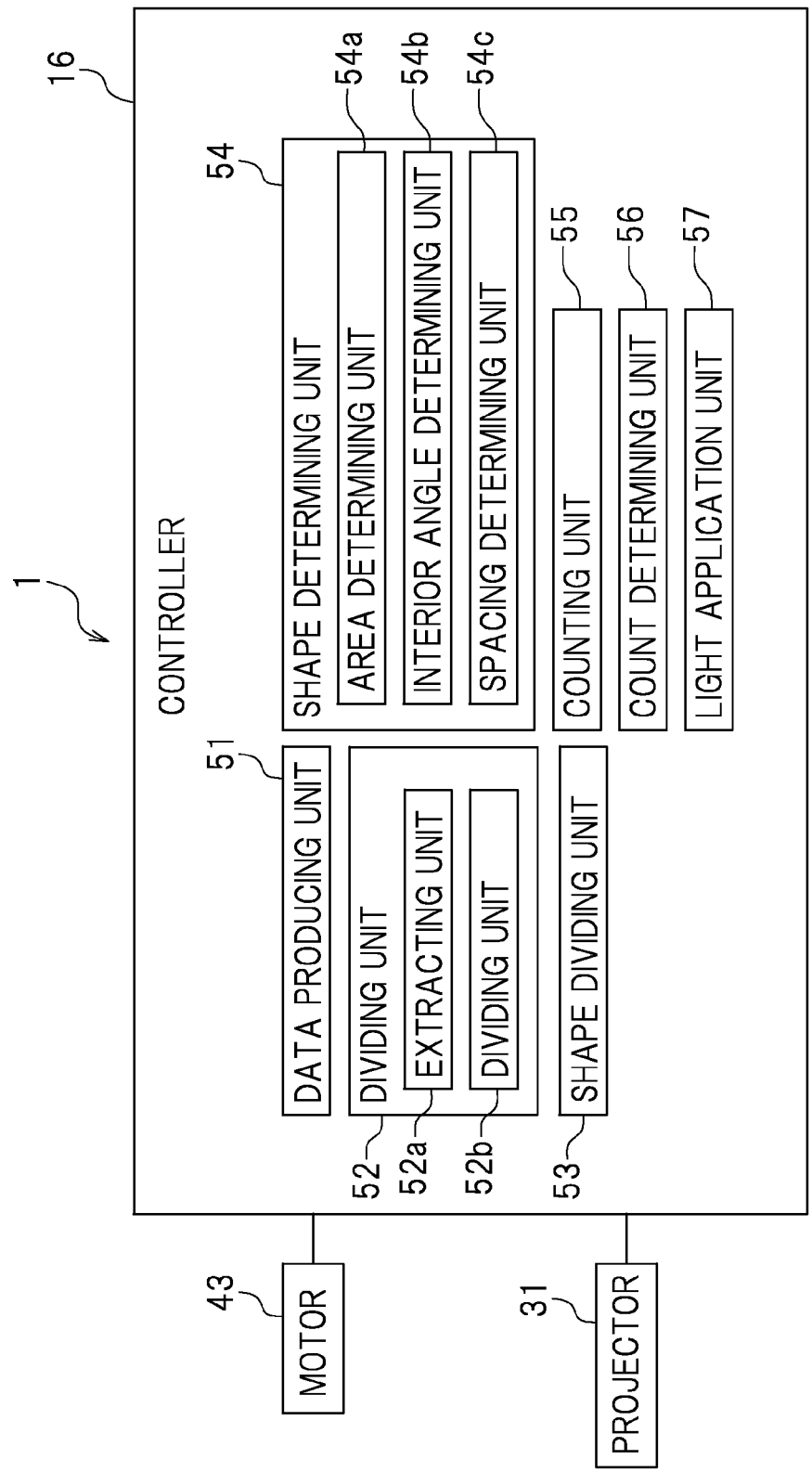
FIG. 3 is a block diagram illustrating main elements of the three-dimensional printing apparatus.

Next, the controller 16 will be described. The controller 16 is connected to the motor 43, which controls the slider 42 fitted with the holder 13 to be raised and lowered, and is connected to the projector 31 of the lighting device 14. The controller 16 drives the motor 43 to move the slider 42 and the holder 13 upward or downward. The controller 16 also controls various parameters of the light emitted from the projector 31, such as energy, luminous intensity, light quantity, wavelength band, shape, and position to be applied. The configuration of the controller 16 is not particularly restricted. For example, the controller 16 may be a computer. The controller 16 preferably includes a central processing unit (hereinafter also referred to as "CPU"), a ROM that stores programs or the like executed by the CPU, and a RAM. FIG. 3 is a block diagram illustrating main elements of the three-dimensional printing apparatus 1. As illustrated in FIG. 3, the controller 16 is configured or programmed to provide and include a data producing unit 51, a dividing unit 52, a divided block calculating unit 53, a shape determining unit 54, a counting unit 55, a count determining unit 56, and a light application unit 57.

Furthermore, a program or programs which is/are operated or executed in the controller 16 or the CPU to define one or more of the data producing unit 51, the dividing unit 52, the divided block calculating unit 53, the shape determining unit 54, the counting unit 55, the count determining unit 56, and the light application unit 57, preferably is a program (program causing a computer to function) controlling the CPU of the controller 16 or the like, in order to realize functions of the data producing unit 51, the dividing unit 52, the divided block calculating unit 53, the shape determining unit 54, the counting unit 55, the count determining unit 56, and the light application unit 57 according to various preferred embodiments of the present invention, including each of various circuitry of the controller 16 and the CPU. Therefore, information which is handled by the controller 16 and the CPU is temporarily accumulated in the RAM or other suitable memory at the time of the processing. Thereafter, the information is stored in various types of circuitry in the form of ROMs and HDDs, and is read out by circuitry within, or included in combination with, the controller 16 and the CPU as necessary, and modification or write-in is performed thereto. As a recording medium storing the program, any one of a semiconductor medium (for example, the ROM, a nonvolatile memory card or the like), an optical recording medium (for example, a DVD, an MO, an MD, a CD, a BD or the like), and a magnetic recording medium (for example, a magnetic tape, a flexible disc or the like) may be used. Moreover, by executing the loaded program or programs, the functions of the various preferred embodiments of the present invention are not only realized, but the functions of the various preferred embodiments of the present invention may be realized by processing the loaded program in combination with an operating system or other application programs, based on an instruction of the program.

Moreover, the program or programs executed by the controller 16 and the CPU can be distributed by being stored in the portable recording medium, or the program can be transmitted to a server computer which is connected through a network such as the Internet. In this case, a storage device of the server computer is also preferably included in the present invention. Still more, in the preferred embodiments of the present invention, any portion of the controller 16, the CPU, and the data producing unit 51, the dividing unit 52, the divided block calculating unit 53, the shape determining unit 54, the counting unit 55, the count determining unit 56, and the light application unit 57, or the whole thereof may be realized as an LSI which is typically an integrated circuit. Each functional unit or circuitry of the controller 16 or the CPU, may be individually chipped, or a portion thereof, or the whole thereof may be chipped by being integrated. In a case of making each functional unit or circuitry as an integrated circuit, an integrated circuit controller that controls the integrated circuits, is preferably added.

Additionally, the method for making an integrated circuit is not limited to the LSI, and may be realized by a single-purpose circuit or a general-purpose processor. Moreover, in a case of an appearance of a technology for making an integrated circuit which replaces the LSI due to an advance of a semiconductor technology, it is possible to use an integrated circuit depending on the technology.

The data producing unit 51 produces cross-sectional shapes of a three-dimensional object. Herein, the data producing unit 51 produces slice data in which the cross-sectional shapes are digitized. Note that the data producing unit 51 may be omitted. It is possible that the data of the cross-sectional shapes may be produced in advance by a personal computer or the like. It is also possible that the data of the cross-sectional shapes may be made of existing distributed data.

The dividing unit 52 divides at least one of the cross-sectional shapes of the three-dimensional object into a plurality of blocks. Herein, the dividing unit 52 divides the cross-sectional shape into a plurality of blocks, as a pre-process to determine whether or not the cross-sectional shape is a complicated shape. The dividing unit 52 includes an extracting unit 52a and a shape dividing unit 52b.

Figure 4:
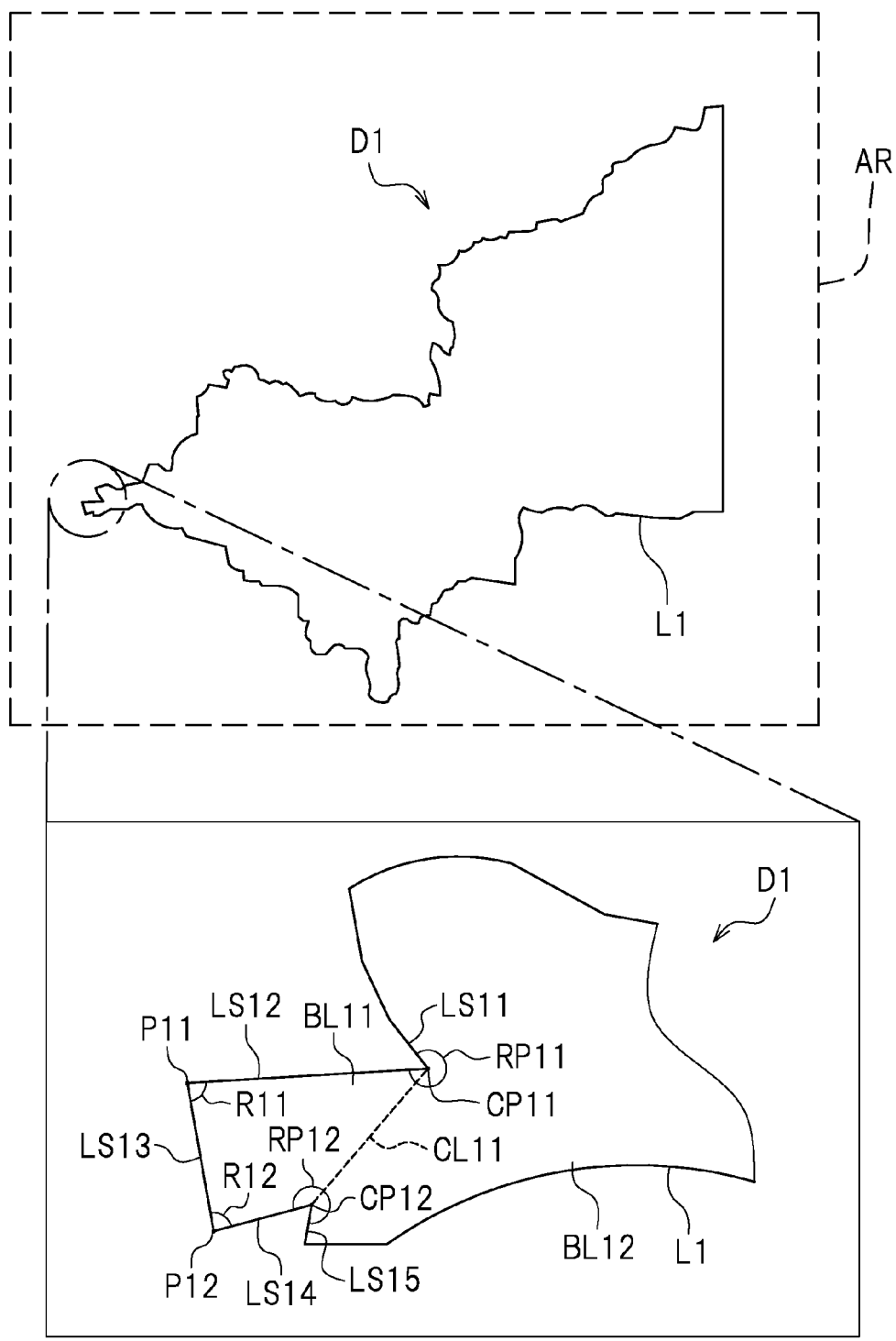
FIG. 4 is a view illustrating an example in which a cross-sectional shape is divided into a plurality of blocks.

When dividing the cross-sectional shape into a plurality of blocks, the extracting unit 52a extracts characteristic points, which serve as the datum points for the division. In the present preferred embodiment, if the interior angle defined by two adjacent line segments among a plurality of line segments that define a contour of the cross-sectional shape is equal to or greater than a predetermined interior angle, the extracting unit 52a defines the connecting point of the adjacent line segments as a characteristic point. The degree of the predetermined interior angle is not particularly restricted. It is preferable that the predetermined interior angle be, for example, from 180 degrees to 360 degrees. Herein, the predetermined interior angle is preferably set at 270 degrees, for example. The predetermined interior angle is determined in advance and stored in the controller 16 in advance. FIG. 4 is a view illustrating an example in which a cross-sectional shape D1 is divided into a plurality of blocks BL11 and BL12. For example, in FIG. 4, an interior angle RP11, which is defined by adjacent line segments LS11 and LS12, and an interior angle RP12, which is defined by adjacent line segments LS14 and LS15, preferably are equal to or greater than 270 degrees, for example. Therefore, in the case of FIG. 4, the connecting point CP11 of the line segment LS11 and the line segment LS12, and the connecting point CP12 of the line segment LS14 and the line segment LS15 are defined as the characteristic points. On the other hand, an interior angle R11, which is defined by adjacent line segments LS12 and LS13, and an interior angle R12, which is defined by adjacent line segments LS13 and LS14, preferably are less than 270 degrees, for example. Therefore, the connecting point P11 of the line segment LS12 and the line segment LS13, and the connecting point P12 of the line segment LS13 and the line segment LS14 are not characteristic points. In the present preferred embodiment, among the connecting points of adjacent line segments in a contour L1 of the cross-sectional shape D1, the connecting points at which the directions of the line segments change abruptly are extracted as the characteristic points.

Figure 5:
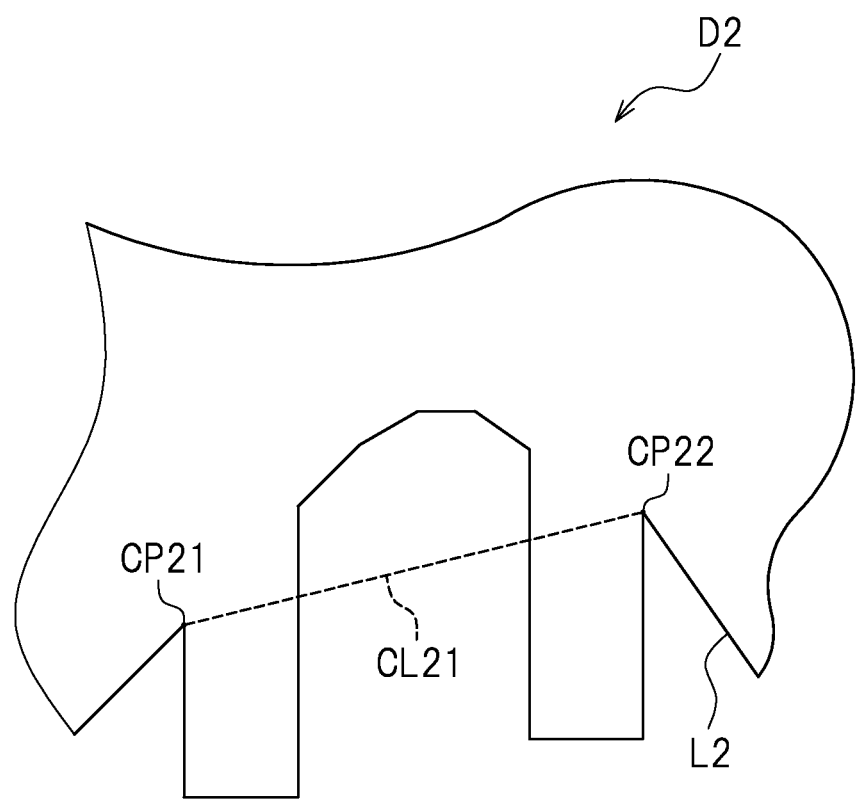
FIG. 5 is a view illustrating an example in which a cross-sectional shape cannot be divided into a plurality of blocks.

The shape dividing unit 52b shown in FIG. 3 divides the cross-sectional shape of the three-dimensional object into a plurality of blocks based on the characteristic points extracted by the extracting unit 52a. When the extracting unit 52a extracts a plurality of characteristic points and when the connecting line that connects two adjacent ones of the characteristic points to each other is within the region of the cross-sectional shape, the shape dividing unit 52b divides the cross-sectional shape into a plurality of blocks at the connecting line. In FIG. 4, the points P11 and P12 are not characteristic points, so the characteristic points that are adjacent to each other on the contour L1 of the cross-sectional shape D are the points CP11 and CP12. The connecting line CL11 that connects the characteristic points CP11 and CP12 to each other is within the region of the cross-sectional shape D1. Accordingly, in FIG. 4, the cross-sectional shape D1 can be divided into blocks BL11 and BL12 with the connecting line CL11 as the boundary. FIG. 5 is a view illustrating an example in which a cross-sectional shape D2 cannot be divided into a plurality of blocks. In the case of the cross-sectional shape D2 as in FIG. 5, points CP21 and CP22 are the characteristic points. A portion of the connecting line CL21 that connects the adjacent characteristic points CP21 and CP22 to each other on a contour L2 of the cross-sectional shape D2 is outside the region of the cross-sectional shape D2. Accordingly, in the case of the cross-sectional shape D2 as shown in FIG. 5, the cross-sectional shape D2 cannot be divided into a plurality of blocks with the connecting line CL21 as the boundary.

The divided block calculating unit 53 shown in FIG. 3 counts the total number of the blocks divided by the dividing unit 52. Herein, the total number of the blocks counted by the divided block calculating unit 53 is stored in a storage area (not shown) of the controller 16.

The shape determining unit 54 determines whether or not each one of the blocks divided by the dividing unit 52 has a predetermined shape. If the one of the divided blocks has the predetermined shape, the shape determining unit 54 defines the one of the blocks as a characteristic block. If the one of the blocks does not have the predetermined shape, the shape determining unit 54 determines that the one of the blocks is a non-characteristic block. In the present preferred embodiment, the shape determining unit 54 includes an area determining unit 54a, an interior angle determining unit 54b, and a spacing determining unit 54c. Herein, the predetermined shape is a complicated shape. The complicated shape is a shape that is determined to be the predetermined shape by any of the area determining unit 54a, the interior angle determining unit 54b, and the spacing determining unit 54c.

The area determining unit 54a determines that a block has a complicated shape if the proportion of the area of that block to the area of a target region AR (see FIG. 4) of the projector 31 is within a predetermined proportion (hereinafter also referred to as a predetermined area proportion). The predetermined area proportion is not particularly restricted. For example, the predetermined area proportion may be about 10% of the area of the target region AR of the projector 31. In the present preferred embodiment, the predetermined area proportion and the area of the target region AR of the projector 31 are determined in advance. For example, the predetermined area proportion and the area of the target region AR of the projector 31 are stored in the controller 16 in advance. In FIG. 4, the area of the block BL11 preferably is equal to or less than about 10% of the target region AR of the projector 31, for example. Therefore, the area determining unit 54a determines that the block BL11 has a complicated shape. The area determining unit 54a determines a block having a small area, the block BL11, to be a characteristic block.

Figure 6:
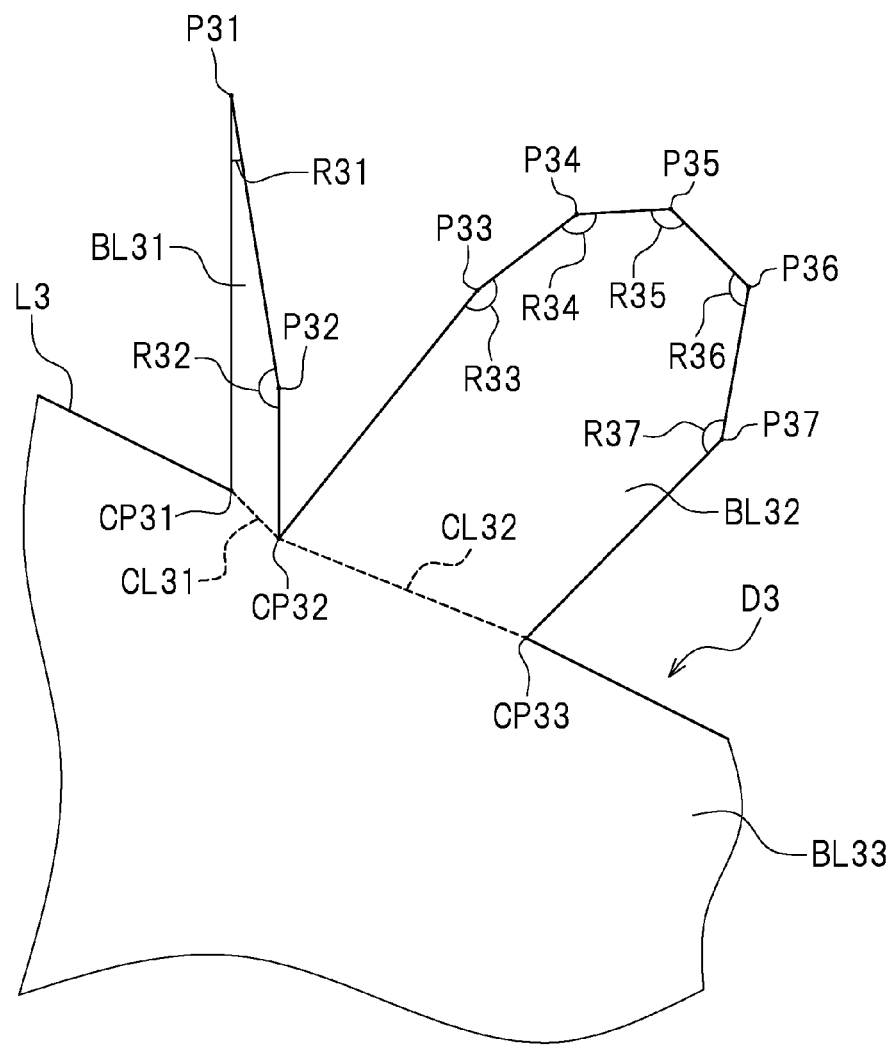
FIG. 6 is a view illustrating an example of a cross-sectional shape having a block that is determined to be a characteristic block by an interior angle determining unit.

The interior angle determining unit 54b determines that a block is a characteristic block if, among the interior angles of the block, the smallest one of the interior angles at the vertices other than the characteristic points extracted by the extracting unit 52a is an acute angle (preferably equal to or less than about 30 degrees, for example). FIG. 6 is a view illustrating an example of a cross-sectional shape D3 having a block BL31 that is determined to be a characteristic block by the interior angle determining unit 54b. In the cross-sectional shape D3 as in FIG. 6, points CP31, CP32, and CP33 are extracted as the characteristic points. The cross-sectional shape D3 is divided into blocks BL31, BL32, and BL33 with a connecting line CL31 that connects the characteristic points CP31 and CP32 to each other and a connecting line CL32 that connects the characteristic points CP32 and CP33 to each other as the boundaries. For example, among the vertices of the block BL31, the vertices other than the characteristic points CP31 and CP32 are vertices P31 and P32. The smallest one of interior angles R31 and R32 at the vertices P31 and P32 is the interior angle R31. This interior angle R31 is an acute angle. Therefore, in FIG. 6, the block BL31 is determined to be a characteristic block by the interior angle determining unit 54b. On the other hand, among the vertices of the block BL32, the vertices other than the characteristic points CP32 and CP33 are vertices P33 to P37. However, none of interior angles R33 to R37 at the vertices P 33 to P37 is an acute angle. Therefore, the block BL32 is determined to be a non-characteristic block by the interior angle determining unit 54b. The interior angle determining unit 54b determines that the block BL31, which has a pointed shape, is a characteristic block among the shapes defined by a contour L3 of the cross-sectional shape D3.

Figure 7:
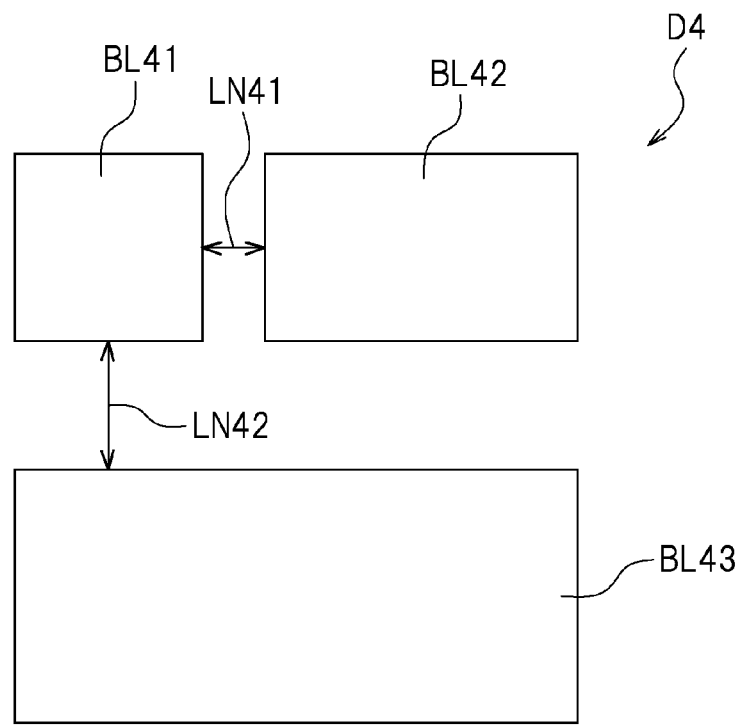
FIG. 7 is a view illustrating an example of a cross-sectional shape having a block that is determined to be a characteristic block by a spacing determining unit.

The spacing determining unit 54c determines a block to be a characteristic block if adjacent blocks are spaced apart from each other and the spacing distance therebetween is equal to or less than a predetermined distance. Herein, the predetermined distance is not particularly restricted. For example, it is preferable that the predetermined distance be from about 0.1 mm to about 4 mm, more preferably about 0.1 mm to about 2 mm. Herein, the predetermined distance may be set at about 2 mm, for example. This predetermined distance is determined in advance. For example, the predetermined distance is stored in the controller 16 in advance. FIG. 7 is a view illustrating an example of a cross-sectional shape D4 having a block BL41 that is determined to be a characteristic block by the spacing determining unit 54c. The cross-sectional shape D4 shown in FIG. 7 is divided into three blocks BL41, BL42, and BL43 by their contours. The block BL41 is spaced apart from the blocks BL42 and BL43. The spacing distance between the block BL41 and the block BL42 is a distance LN41. The spacing distance between the block BL42 and the block BL43 is a distance LN42. The term "spacing distance" means the shortest distance between a block and another block. Here, if both the distances LN41 and LN42 are larger than the predetermined distance, the spacing determining unit 54c determines the block BL41 to be a non-characteristic block. On the other hand, if at least one of the distances LN41 and LN42 is equal to or less than the predetermined distance, the spacing determining unit 54c determines that the block BL41 has a complicated shape. At this time, the spacing determining unit 54c determines the block BL41 to be a characteristic block. The spacing determining unit 54c determines a block to be a characteristic block if the gap between the blocks adjacent to each other is narrow.

In the present preferred embodiment, the shape determining unit 54 defines a block as a characteristic block if at least one of the area determining unit 54a, the interior angle determining unit 54b, and the spacing distance determining unit 54c determines the block to be a characteristic block. On the other hand, the shape determining unit 54 defines a block as a non-characteristic block if all of the area determining unit 54a, the interior angle determining unit 54b, and the spacing distance determining unit 54c determine the block to be a non-characteristic block.

The counting unit 55 counts the number of the blocks that have been determined by the shape determining unit 54 to be the characteristic blocks. Herein, the counted number of the characteristic blocks is stored in the storage area of the controller 16.

The count determining unit 56 determines whether or not the proportion of the number of the characteristic blocks counted by the counting unit 55 to the total number of the blocks counted by the divided block calculating unit 53 is equal to or greater than a predetermined proportion (hereinafter also referred to as a "predetermined percentage"). The predetermined percentage is not particularly restricted. Herein, the predetermined percentage is preferably set at about 50%, for example. Note that the predetermined percentage is determined in advance. Herein, the predetermined percentage is stored in the controller 16 in advance.

The light application unit 57 adjusts the energy of light emitted from the projector 31 of the lighting device 14. The light application unit 57 sets the energy of the light from the projector 31 to a first energy when applying the light to the photocurable resin 23 in a region corresponding to the characteristic blocks if the count determining unit 56 determines that the proportion of the number of the characteristic blocks to the total number of the blocks is less than the predetermined percentage. On the other hand, the light application unit 57 sets the energy of the light from the projector 31 to a second energy when applying the light to the photocurable resin 23 in the region corresponding to the characteristic blocks if the count determining unit 56 determines that the proportion of the number of the characteristic blocks to the total number of the blocks is equal to or greater than the predetermined percentage. Herein, the second energy is lower than the first energy. For example, the first energy is a normal energy of the light to be applied from the projector 31 to the photocurable resin 23 in the region corresponding to the characteristic blocks (i.e., an energy of the light to be applied in a normal condition). The numerical values of the first energy and the second energy are determined in advance. For example, the numerical values of the first energy and the second energy are stored in the controller 16 in advance. Note that the light application unit 57 sets the energy of the light from the projector 31 to the first energy, which is the energy of the light applied in a normal condition, when applying the light to the photocurable resin 23 in the region corresponding to the blocks that have been determined to be non-characteristic blocks by the shape determining unit 54.

When three-dimensional objects are formed using the same vat 12 for a long period of time, as shown in FIG. 1, the portion of the vat 12 that has been exposed to light may often be whitened. When light is applied to the whitened vat 12 to cure the photocurable resin 23 in the vat 12, a portion of the light may be blocked by the whitened portion of the vat 12. As a consequence, the photocurable resin 23 may not be cured appropriately in an adjacent region to the whitened portion of the vat 12. Consequently, the desired cross-sectional shape may not be obtained. As a consequence, the product quality of the resulting three-dimensional object may be degraded. A possible cause of the whitening of the vat 12 is as follows.

Figure 8:
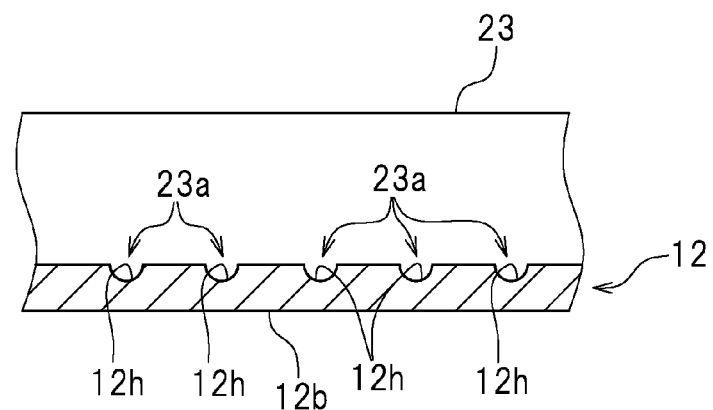
FIG. 8 is an enlarged view of a vat, which illustrates how the whitening of the vat occurs.

FIG. 8 is an enlarged view of the vat 12, which illustrates how the whitening of the vat 12 may occur. As illustrated in FIG. 8, a plurality of microcavities 12h are provided in the surface of the vat 12, which is preferably made of a resin. Photocurable resin particles 23a enter the microcavities 12h and are trapped in the microcavities 12h. When light is applied from the projector 31 to the photocurable resin particles 23a trapped in the microcavities 12h, the photocurable resin particles 23a are cured inside the microcavities 12h. It is often the case that when the cured photocurable resin 23 is drawn up from the vat 12 by the holder 13, the photocurable resin particles 23a that have been trapped and cured in the microcavities 12h cannot be pulled out of the microcavities 12h. Thus, the cured photocurable resin particles 23a remain in the microcavities 12h of the vat 12, causing the vat 12 to be whitened. In view of this problem, the whitening of the vat 12 is prevented when the cured photocurable resin particles 23a have such a degree of hardness that the photocurable resin particles 23a is able to be pulled out of the microcavities 12h, even if the photocurable resin particles 23a have been trapped and cured in the microcavities 12h. Herein, the whitening of the vat 12 is prevented by lowering the energy of the light emitted from the projector 31 so as to reduce the hardness of the cured photocurable resin particles 23a. The controller 16 adjusts the energy of light emitted from the projector 31 as appropriate by using the dividing unit 52, the divided block calculating unit 53, the shape determining unit 54, the counting unit 55, the count determining unit 56, and the light application unit 57.

Next, the process steps performed to adjust the energy of light emitted from the projector 31 by the controller 16 will be described with reference to the flow chart of FIG. 9. First, cross-sectional shapes of the three-dimensional object to be formed are prepared. Herein, the data producing unit 51 produces a plurality of cross-sectional shapes corresponding to the three-dimensional object.

Figure 9:
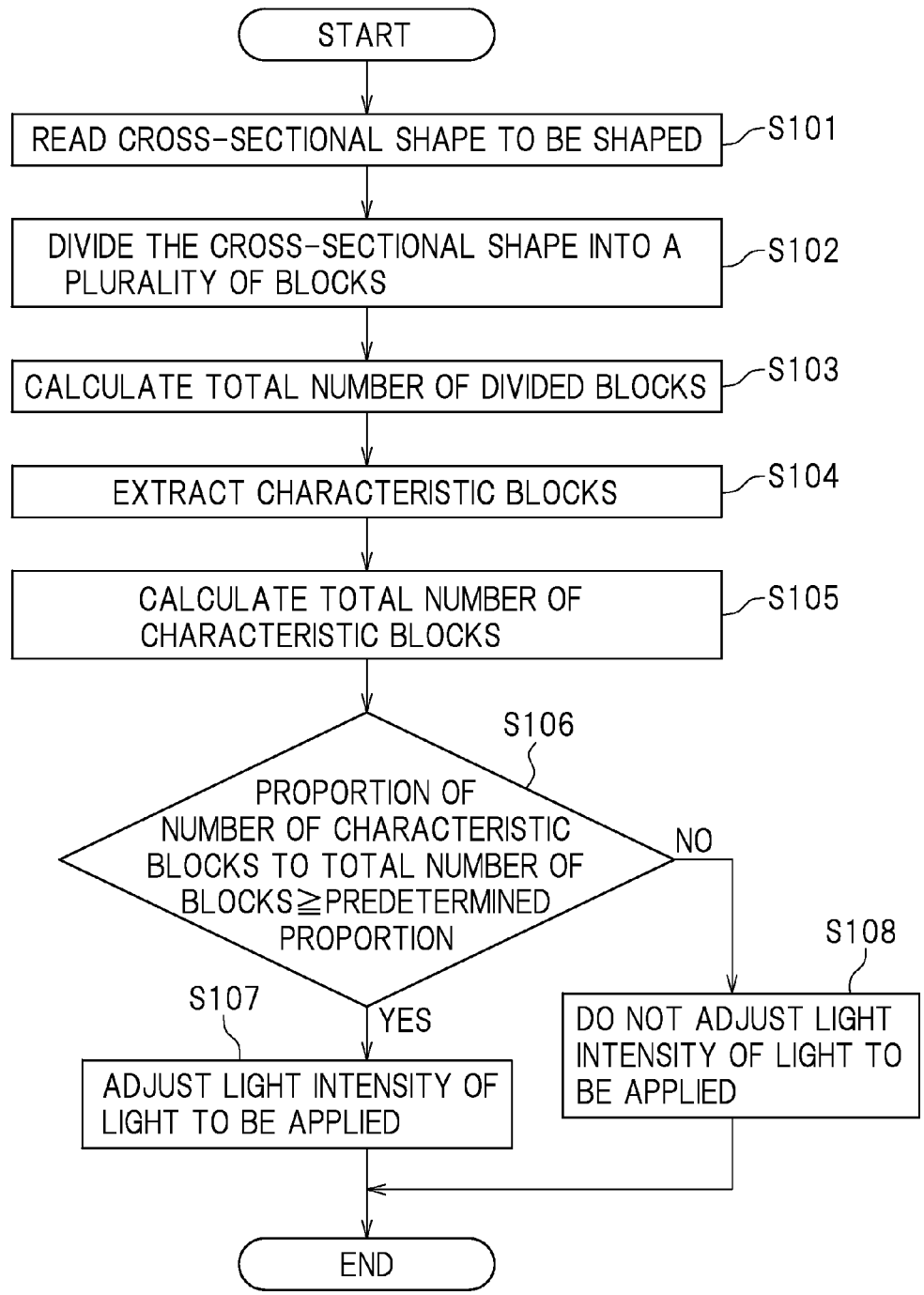
FIG. 9 is a flow chart illustrating the steps performed to adjust the energy of light emitted from a projector.

As illustrated in FIG. 9, at step S101, the controller 16 reads a cross-sectional shape to be formed, among the plurality of cross-sectional shapes produced by the data producing unit 51. At step S102, the cross-sectional shape that has been read at step S101 is divided into a plurality of blocks. In the example shown in FIG. 4, for example, the characteristic points CP11 and CP12 are extracted among the vertices of the cross-sectional shape D1 by the extracting unit 52a of the dividing unit 52. The cross-sectional shape D1 is divided at the connecting line CL11 by the shape dividing unit 52b if the connecting line CL11, which connects the two adjacent characteristic points CP11 and CP12 on the contour L1 of the cross-sectional shape D1, is within the region of the cross-sectional shape D1. Thus, the cross-sectional shape D1 is divided into the blocks BL11 and BL12. At step S103, the divided block calculating unit 53 counts the total number of the divided blocks.

Next, at step S104, the shape determining unit 54 determines whether or not each one of the plurality of divided blocks has a complicated shape. Among the plurality of divided blocks, at least one of the blocks that has been determined to have a complicated shape is defined as a characteristic block. In other words, at step S104, the shape determining unit 54 extracts at least one characteristic block from the plurality of divided blocks. In the present preferred embodiment, the term "complicated shape" includes a shape having a small area, which is determined by the area determining unit 54a, a sharp pointed shape, which is determined by the interior angle determining unit 54b, and a shape having a narrow gap from an adjacent block, which is determined by the spacing determining unit 54c, such as described above.

Thereafter, at step S105, the counting unit 55 counts the number of the blocks that have been determined by the shape determining unit 54 to be the characteristic blocks. At step S106, the count determining unit 56 determines whether or not the proportion of the number of the characteristic blocks counted by the counting unit 55 to the total number of the blocks counted by the divided block calculating unit 53 is equal to or greater than a predetermined percentage (for example, about 50% of the total number of the divided blocks). At this step, if the proportion the number of the characteristic blocks to the total number of the blocks is equal to or greater than the predetermined percentage (if YES), step S107 is executed next. On the other hand, if the proportion of the number of the characteristic blocks to the total number of the blocks is less than the predetermined percentage (if NO), step S108 is executed next.

If it is determined at step S106 that the proportion of the number of the characteristic blocks to the total number of the blocks is equal to or greater than the predetermined percentage, the energy of the light to be applied to the photocurable resin 23 is adjusted at the next step S107. Here, the light application unit 57 sets the energy of the light to be applied to the photocurable resin 23 in the region corresponding to the characteristic blocks to the second energy, which is lower than the first energy. Note that the energy of the light to be applied to the photocurable resin 23 in the region corresponding to the non-characteristic blocks is kept at the first energy, in other words, at the energy applied in a normal condition.

If it is determined at step S106 that the proportion of the number of the characteristic blocks to the total number of the blocks is less than the predetermined percentage, the energy of the light to be applied to the photocurable resin 23 is not adjusted at the next step S108. Here, the energy of the light emitted from the projector 31 is not changed to the second energy but kept at the first energy (normal energy), which is higher than the second energy, so that the photocurable resin 23 in the vat 12 is exposed to the light.

At step S107 and step S108, the photocurable resin 23 is cured by exposure to the light thereto so as to form a resin having a shape corresponding to the cross-sectional shape read in step S101, and thereafter, the cured photocurable resin 23 is drawn up from the vat 12 by the holder 13. Although not shown in the figure, the process may return to step S101, and the controller 16 may read the next cross-sectional shape. In this way, the photocurable resin 23 is cured to form resin layers having corresponding shapes to the cross-sectional shapes, and the formed resin layers are successively stacked one on top of the other. Thus, the desired three-dimensional object is formed.

When forming a three-dimensional object in the present preferred embodiment, the series of the process steps from S101 to S108 are carried out for all the cross-sectional shapes, from the cross-sectional shape that is formed first to the cross-sectional shape that is formed last, so that the energy of the light emitted from the projector 31 is lowered as appropriate. However, the above-described series of process steps may be carried out for only some of the cross-sectional shapes from the cross-sectional shape that is formed first through the cross-sectional shape that is formed last. For example, the series of process steps from S101 to S108 may be carried out either for the cross-sectional shapes that are formed in the last half of the entire shape-forming process, or for the cross-sectional shapes that are formed in the first half of the entire shape-forming process.

Thus, in the present preferred embodiment, the shape determining unit 54 determines whether or not each of the plurality of blocks divided by the dividing unit 52 has a predetermined shape, as illustrated in FIG. 3. The predetermined shape is, for example, a complicated shape as described above. When forming such a complicated shape, the energy of the light from the projector 31 is often set high in order to form the shape more precisely. However, when the energy of the light from the projector 31 is set excessively high, the whitening of the vat 12 (see FIG. 1) tends to occur easily. In view of this problem, in the present preferred embodiment, the shape determining unit 54 determines whether or not each of the divided blocks is a characteristic block. Then, the counting unit 55 counts the number of the characteristic blocks. Then, if the count determining unit 56 determines that the proportion of the number of the characteristic blocks to the total number of the divided characteristic blocks is equal to or greater than a predetermined percentage, the cross-sectional shape is able to be determined to be a complicated cross-sectional shape. At this time, the energy of the light to be applied to the photocurable resin 23 in the region corresponding to the characteristic blocks is set to the second energy, which is lower than the first energy (normal energy). This makes it possible to lower the hardness of the photocurable resin 23 in the region corresponding to the characteristic blocks. This means that, even when the photocurable resin particles 23a have been trapped and cured in the microcavities 12h of the vat 12 as shown in FIG. 8, the cured photocurable resin particles 23a are able to be easily pulled out of the microcavities 12h of the vat 12. Thus, the whitening of the vat 12 is prevented.

In the present preferred embodiment, the count determining unit 56 determines whether or not the proportion of the number of the characteristic blocks to the total number of the divided blocks is equal to or greater than a predetermined percentage (for example, about 50%). When the total number of the blocks in the cross-sectional shape is large, the number of the characteristic blocks can be undesirably large. On the other hand, when the total number of the blocks in the cross-sectional shape is small, the number of the characteristic blocks can be undesirably small. For this reason, in the present preferred embodiment, the proportion of the characteristic blocks to the total number of the blocks in the cross-sectional shape is used as the criterion of the determination. As a result, even when the total number of the blocks in the cross-sectional shape is large or small, it is possible to determine whether or not the cross-sectional shape is a complicated shape based on the proportion of the number of the characteristic blocks to the total number of the divided blocks. As a result, it is possible to determine whether or not the cross-sectional shape is a complicated shape more accurately.

As described previously, the characteristic points CP11 and CP12 are extracted by the extracting unit 52a, and the cross-sectional shape D1 is divided into a plurality of blocks BL11 and BL12 by the shape dividing unit 52b, for example as illustrated in FIG. 4. As a result, a portion of the cross-sectional shape D1 that contains an outwardly protruding shape is separated as one block (the block BL11 in FIG. 4). The outwardly protruding shape of the cross-sectional shape D1 is a complicated shape, and is difficult to form. For this reason, the portion containing such a complicated shape is separated as one block BL11, so that the block BL11 of the cross-sectional shape D1, which has the outwardly protruding shape, is able to be determined by the shape determining unit 54 to be a characteristic block.

As illustrated in FIG. 4, for example, the area determining unit 54a determines the block BL11 to be a characteristic block if the proportion of the area of the block BL11 to the area of the target region AR of the projector 31 is equal to or less than a predetermined area proportion (for example, about 10% of the area of the target region AR of the projector 31). Under this condition, the block BL11 is able to be determined to be a block with a small area. The block BL11 with a small area has a complicated shape, and is difficult to form. For this reason, the block BL11 is able to be defined as a characteristic block. Therefore, whether or not a block is a characteristic block is able to be determined by the area determining unit 54a based on the area of the block.

As illustrated in FIG. 6, for example, the interior angle determining unit 54b determines that the cross-sectional shape D3 containing the block BL31 has an outwardly pointed shape if, of the interior angles R31 and R32 of the block BL31 that are at the vertices P31 and P32 but not at the characteristic points CP31 and CP32, the smallest interior angle R31 is an acute angle. The outwardly pointed shape is a complicated shape, and is difficult to form. For this reason, the block BL31, which has a pointed shape, is able to be defined as a characteristic block. Therefore, whether or not a block is a characteristic block can be determined by the interior angle determining unit 54b based on the interior angle of the block.

For example as illustrated in FIG. 7, when the block BL41 is spaced apart from the blocks BL42 and BL43 that are adjacent to the block BL41, the spacing determining unit 54c determines the block BL41 to be a characteristic block if at least one of the spacing distances LN41 and LN42 is equal to or less than a predetermined distance. If the adjacent blocks BL41, BL42, and BL43 are spaced apart from each other and the spacing distances LN41 and LN42 are equal to or less than the predetermined distance, it means that the gaps between the adjacent blocks BL41, BL42, and BL43 are narrow. When the gaps between the blocks BL41, BL42, and BL43 are narrow, the blocks are difficult to form because it is necessary to provide a small space between the blocks BL41, BL42, and BL43. For this reason, the block BL41, which has narrow gaps between it and the adjacent blocks BL42 and BL43, is able to be defined as a characteristic block, which has a complicated shape. Therefore, when a block is spaced apart from an adjacent block thereto, whether or not the block is a characteristic block is able to be determined by the spacing determining unit 54c based on the spacing distance therebetween.

Thus, the three-dimensional printing apparatus 1 according to the present preferred embodiment has been described hereinabove. It should be noted, however, that the three-dimensional printing apparatus according to the present invention is not limited to the three-dimensional printing apparatus 1 according to the present preferred embodiment, but may be embodied in various other forms of preferred embodiments.

Other Preferred Embodiments

In the foregoing preferred embodiments, the light application unit 57 preferably sets the energy of light to the second energy that is lower than the first energy when applying the light to the photocurable resin 23 in a region corresponding to the characteristic blocks if the proportion of the number of the characteristic blocks to the total number of the blocks is determined by the count determining unit 56 to be equal to or greater than a predetermined percentage. In this case, the energy of the light to be applied to the photocurable resin 23 in the region corresponding to the non-characteristic blocks preferably is set to the first energy. However, it is also possible that the light application unit 57 may set the energy of the light from the projector 31 to the second energy when applying the light to the photocurable resin 23 in the region corresponding to the cross-sectional shape if the proportion of the number of the characteristic blocks to the total number of the blocks is determined by the count determining unit 56 to be equal to or greater than a predetermined percentage. This makes it possible to lower the energy of the light from the projector 31 for the entire region of the cross-sectional shape without performing a complicated control operation, such as adjusting the light energy region by region, so that the adjusted light is able to be applied to the photocurable resin 23 in the vat 12.

As illustrated in FIG. 3, in the foregoing preferred embodiment, the count determining unit 56 preferably determines whether or not the proportion of the number of the characteristic blocks counted by the counting unit 55 to the total number of the blocks is equal to or greater than a predetermined percentage. It is also possible, however, that the count determining unit 56 may determine whether or not the number of the characteristic blocks counted by the counting unit 55 is equal to or greater than a predetermined number. The predetermined number is a constant. The predetermined number is a number that has been determined in advance. Herein, the predetermined number is stored in the controller 16 in advance. Thus, if the count determining unit 55 determines that the number of the characteristic blocks is equal to or greater than a predetermined number, the cross-sectional shape is able to be determined to be a complicated cross-sectional shape. Thus, even when the criterion of the determination is a constant, it is possible to determine whether or not the cross-sectional shape is a complicated shape, as in the first preferred embodiment. Based on this determination, the energy of the light to be applied to the photocurable resin 23 in at least the region corresponding to the characteristic blocks is set to the second energy that is lower than the first energy. In this way, the hardness of the cured photocurable resin 23 is able to be lowered. This means that, even when the photocurable resin particles 23a have been trapped and cured in the microcavities 12h of the vat 12 as shown in FIG. 8, the cured photocurable resin particles 23a are easily pulled out of the microcavities 12h of the vat 12. As a result, the whitening of the vat 12 is prevented. In this case, if it is determined that the number of the characteristic blocks is less than the predetermined number, the light application unit 57 applies the light to the photocurable resin 23 in the vat 12 without lowering the energy of the light from the projector 31 but with the first energy, which is the energy of the light applied in a normal condition.

On the other hand, the light application unit 57 may set the energy of the projector 31 to the second energy that is lower than the first energy when applying the light to the photocurable resin 23 in the region corresponding to the characteristic blocks, if the number of the characteristic blocks is determined by the count determining unit 56 to be equal to or greater than the predetermined number. Thus, when the count determining unit 56 determines that the number of the characteristic blocks is equal to or greater than a predetermined number, the energy of the light that is emitted from the projector 31 to the entire region corresponding to the cross-sectional shape is able to be made lower than the first energy. Accordingly, it is possible to make the energy of the light from the projector 31 lower than the first energy for the entire region without performing a complicated control operation, such as adjusting the light energy region by region, so that the adjusted light is applied to the photocurable resin 23 in the vat 12.

In the foregoing preferred embodiment, the area determining unit 54a preferably determines that a block has a complicated shape and therefore that block is a characteristic block, if the proportion of the area of that block to the area of the target region AR (see FIG. 4) of the projector 31 is within a predetermined area proportion. Thus, in the foregoing preferred embodiment, the area of a block is compared with the area of the target region AR of the projector 31. However, the area of a block may not necessarily be compared with the area of the target region AR of the projector 31. The area of a block may be compared with a proportion of the area of the block to the area of the entire cross-sectional shape (for example, about 50% of the area of the entire cross-sectional shape). In this case, the area determining unit 54a may determine that a block has a complicated shape if the proportion of the area of that block to the area of the entire cross-sectional shape is within a predetermined proportion (for example, about 50%). Accordingly, the area determining unit 54a may define the block that has been determined to have a complicated shape as a characteristic block.

The terms and expressions which have been used herein are used as terms of description and not of limitation. There is no intention in the use of such terms and expressions of excluding any equivalents of any of the features shown or described, or portions thereof, and it is recognized that various modifications are possible within the scope of the present invention claimed. The present invention may be embodied in many different forms. This disclosure should be considered as providing exemplary preferred embodiments of the principles of the invention. These preferred embodiments are described herein with the understanding that such preferred embodiments are not intended to limit the invention to any specific preferred embodiments described and/or illustrated herein. The present invention is not limited to specific preferred embodiments described herein. The present invention encompasses all the preferred embodiments including equivalents, alterations, omissions, combinations, improvements, and/or modifications that can be recognized by those skilled in the arts based on this disclosure. Limitations in the claims should be interpreted broadly based on the language used in the claims, and such limitations should not be limited to specific preferred embodiments described in the present description or provided during prosecution of the present application.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A three-dimensional printing apparatus that forms a three-dimensional object by preparing cross-sectional shapes of the three-dimensional object and successively stacking resin layers with corresponding shapes to the cross-sectional shapes, each of the layers formed by curing a liquid photocurable resin, the three-dimensional printing apparatus comprising:
   a vat made of a resin and accommodating the photocurable resin;
   a lighting device disposed below the vat and including a light source emitting light, the lighting device applying the light from the light source to the photocurable resin in the vat; and
   a controller controlling the lighting device; wherein
   the controller is programmed to include:
      a dividing unit that divides at least one of the cross-sectional shapes into a plurality of blocks;
      a divided block calculating unit that counts a total number of the plurality of blocks divided by the dividing unit;
      a shape determining unit that determines whether or not each one of the plurality of blocks divided by the dividing unit has a predetermined shape and that defines at least one of the plurality of blocks that has been determined to have the predetermined shape as a characteristic block;
      a counting unit that counts a number of the characteristic blocks;
      a count determining unit that determines whether or not a proportion of the number of the characteristic blocks counted by the counting unit to the total number of the plurality of blocks counted by the divided block calculating unit is equal to or greater than a predetermined proportion; and
      a light application unit that sets an energy of the light from the light source to a first energy at least when applying the light to the photocurable resin in a region corresponding to the characteristic blocks if the proportion is determined by the count determining unit to be less than the predetermined proportion, and that sets the energy of the light from the light source to a second energy being lower than the first energy at least when applying the light to the photocurable resin in the region corresponding to the characteristic blocks if the proportion is determined by the count determining unit to be equal to or greater than the predetermined proportion.

2. The three-dimensional printing apparatus according to claim 1, wherein the light application unit sets the energy of the light from the light source to the second energy when applying the light to the photocurable resin in a region corresponding to the at least one cross-sectional shape, if the proportion of the number of the characteristic blocks to the total number of the plurality of blocks is determined by the count determining unit to be equal to or greater than the predetermined proportion.

3. The three-dimensional printing apparatus according to claim 1, wherein
the dividing unit is programmed to include:
an extracting unit that extracts a connecting point of adjacent line segments of a contour of the at least one cross-sectional shape as a characteristic point if an interior angle defined by the adjacent line segments is equal to or greater than about 270 degrees; and
a shape dividing unit that, when the extracting unit extracts a plurality of the characteristic points and when a connecting line that connects two adjacent ones of the characteristic points to each other on the contour of the at least one cross-sectional shape is within a region of the at least one cross-sectional shape, divides the at least one cross-sectional shape at the connecting line to divide the at least one cross-sectional shape into the plurality of blocks.

4. The three-dimensional printing apparatus according to claim 3, wherein the shape determining unit is programmed to include an area determining unit that determines one of the plurality of blocks to be the characteristic block if the proportion of the area of the one of the plurality of blocks to the area of a target region of the light source is equal to or less than a predetermined proportion.

5. The three-dimensional printing apparatus according to claim 3, wherein the shape determining unit is programmed to include an interior angle determining unit that determines one of the plurality of blocks to be the characteristic block if, among interior angles at vertices of the one of the plurality of blocks that are not at the characteristic points, a smallest one of the interior angles is an acute angle.

6. The three-dimensional printing apparatus according to claim 3, wherein the shape determining unit is programmed to include a spacing determining unit that determines one of the plurality of blocks to be the characteristic block if the one of the plurality of blocks and an adjacent one of the plurality of blocks are spaced apart from each other and a spacing distance therebetween is equal to or less than a predetermined distance.

7. A three-dimensional printing apparatus that forms a three-dimensional object by preparing cross-sectional shapes of the three-dimensional object and successively stacking resin layers with corresponding shapes to the cross-sectional shapes, each of the layers formed by curing a liquid photocurable resin, the three-dimensional printing apparatus comprising:
a vat made of a resin and accommodating the photocurable resin;
a lighting device disposed below the vat and including a light source emitting light, the lighting device applying the light from the light source to the photocurable resin in the vat; and
a controller controlling the lighting device; wherein
the controller is programmed to include:
a dividing unit that divides at least one of the cross-sectional shapes into a plurality of blocks;
a divided block calculating unit that counts a total number of the plurality of blocks divided by the dividing unit;
a shape determining unit that determines whether or not each one of the plurality of blocks divided by the dividing unit has a predetermined shape and that defines at least one of the plurality of blocks that has been determined to have the predetermined shape as a characteristic block;
a counting unit that counts a number of the characteristic blocks;
a count determining unit that determines whether or not the number of the characteristic blocks counted by the counting unit is equal to or greater than a predetermined number; and
a light application unit that sets an energy of the light from the light source to a first energy at least when applying the light to the photocurable resin in a region corresponding to the characteristic blocks if the number of the characteristic blocks is determined by the count determining unit to be less than the predetermined number, and that sets the energy of the light from the light source to a second energy being lower than the first energy at least when applying the light to the photocurable resin in the region corresponding to the characteristic blocks if the number of the characteristic blocks is determined by the count determining unit to be equal to or greater than the predetermined number.

8. The three-dimensional printing apparatus according to claim 7, wherein the light application unit sets the energy of the light from the light source to the second energy when applying the light to the photocurable resin in the region corresponding to the at least one cross-sectional shape, if the number of the characteristic blocks is determined by the count determining unit to be equal to or greater than the predetermined number.

9. The three-dimensional printing apparatus according to claim 7, wherein
the dividing unit is programmed to include:
an extracting unit that extracts a connecting point of adjacent line segments of a contour of the at least one cross-sectional shape as a characteristic point if an interior angle defined by the adjacent line segments is equal to or greater than about 270 degrees; and
a shape dividing unit that, when the extracting unit extracts a plurality of the characteristic points and when a connecting line that connects two adjacent ones of the characteristic points to each other on the contour of the at least one cross-sectional shape is within a region of the at least one cross-sectional shape, divides the at least one cross-sectional shape at the connecting line to divide the at least one cross-sectional shape into the plurality of blocks.

10. The three-dimensional printing apparatus according to claim 9, wherein the shape determining unit is programmed to include an area determining unit that determines one of the plurality of blocks to be the characteristic block if a proportion of the area of the one of the plurality of blocks to the area of a target region of the light source is equal to or less than a predetermined proportion.

11. The three-dimensional printing apparatus according to claim 7, wherein the shape determining unit is programmed to include an interior angle determining unit that determines one of the plurality of blocks to be the characteristic block if, among interior angles at vertices of the one of the plurality of blocks that are not at the characteristic points, a smallest one of the interior angles is an acute angle.

12. The three-dimensional printing apparatus according to claim 7, wherein the shape determining unit is programmed to include a spacing determining unit that determines one of the plurality of blocks to be the characteristic block if the one of the plurality of blocks and an adjacent one of the plurality of blocks are spaced apart from each other and a spacing distance therebetween is equal to or less than a predetermined distance.

* * * * *